US009387455B2

(12) United States Patent
Quintero et al.

(10) Patent No.: US 9,387,455 B2
(45) Date of Patent: Jul. 12, 2016

(54) APPARATUS AND METHOD FOR ADIABATIC METHANE CONVERSION

(76) Inventors: Ruben Dario Rodriguez Quintero, Aberdeen (GB); Ernesto Manuel Santana Diaz, Aberdeen (GB); James Andrew Banister, Aberdeen (GB)

( * ) Notice: Subject to any disclaimer, the term of this patent is extended or adjusted under 35 U.S.C. 154(b) by 0 days.

(21) Appl. No.: 13/261,354

(22) PCT Filed: Jan. 7, 2011

(86) PCT No.: PCT/GB2011/050014
§ 371 (c)(1),
(2), (4) Date: Oct. 16, 2012

(87) PCT Pub. No.: WO2011/083332
PCT Pub. Date: Jul. 14, 2011

(65) Prior Publication Data
US 2013/0032762 A1 Feb. 7, 2013

(30) Foreign Application Priority Data
Jan. 7, 2010 (GB) .................................. 1000160.0

(51) Int. Cl.
*B01J 12/00* (2006.01)
*B01J 19/24* (2006.01)
*B01J 35/06* (2006.01)
*C01B 3/38* (2006.01)
*C01B 13/02* (2006.01)

(52) U.S. Cl.
CPC ............ *B01J 19/2475* (2013.01); *B01J 35/065* (2013.01); *C01B 3/386* (2013.01); *C01B 13/0251* (2013.01); *B01J 2219/00155* (2013.01); *C01B 2203/0261* (2013.01); *C01B 2203/1047* (2013.01); *C01B 2203/1241* (2013.01)

(58) Field of Classification Search
None
See application file for complete search history.

(56) References Cited

U.S. PATENT DOCUMENTS

| 6,248,809 | B1 | 6/2001 | Buckley et al. | |
|---|---|---|---|---|
| 7,641,888 | B2 | 1/2010 | Gobina et al. | |
| 2004/0105812 | A1* | 6/2004 | Tonkovich et al. | ........... 423/650 |
| 2006/0029539 | A1* | 2/2006 | Dutta et al. | ................... 423/651 |
| 2006/0239874 | A1* | 10/2006 | Gobina et al. | ................ 422/192 |

FOREIGN PATENT DOCUMENTS

DE 10114173 A1 12/2001

OTHER PUBLICATIONS

Experimental and simulation study on a catalyst packed tubular dense membrane reactor for partial oxidation of methane to syngas W. Jin et al. Chemical Engineering Science vol. 55, pp. 2617-2625, (2000).*
International Preliminary Report on Patentability and Written Opinion of the International Searching Authority, WIPO, Jul. 10, 2012 (6 pages).
EPO, International Search Report, pp. 1-2, Apr. 27, 2011.

* cited by examiner

*Primary Examiner* — Melvin C Mayes
*Assistant Examiner* — Douglas Call

(57) ABSTRACT

There is herein described a process and apparatus for hydrocarbon conversion. More particularly, there is described a process and apparatus for adiabatic methane conversion into synthetic gas (i.e. syngas).

19 Claims, 7 Drawing Sheets

APPARATUS AND METHOD FOR ADIABATIC METHANE CONVERSION

FIELD OF THE INVENTION

The present invention relates to a process and apparatus for hydrocarbon conversion. More particularly, the present invention relates to a process and apparatus for adiabatic methane conversion into synthetic gas (i.e. syngas).

BACKGROUND OF THE INVENTION

There are three main technologies that are used for the production of syngas from methane: steam reforming; autothermal reforming and partial oxidation (catalytic and non-catalytic). The most commonly used are autothermal and steam reforming or a combination of the two. Both these technologies require a large proportion of steam to be included with the methane feed to prevent coke formation and reforming catalyst deactivation. In order to achieve high energy efficiency the large amount of sensible and latent heat contained within the steam must be recovered and recycled to the process.

Non-catalytic partial oxidation does not require the high levels of steam but the very high process temperatures (>1200 deg C.) create energy efficiency challenges of their own.

One more recent, non-commercial technology is the catalytic partial oxidation of methane using rhodium catalysts. Rhodium has been found to be highly selective in the oxidation with minimal coke formation allowing the partial oxidation process to be run at much lower temperatures. The process does not require steam to operate, although small quantities (10% vol % of the methane feed) are frequently described as a means of increasing the hydrogen to carbon monoxide ratio in the resultant syngas.

The simplicity of the system, with little or no steam, a lower temperature of operation and a highly active catalyst promises a compact and efficient process that is capable of operating efficiently without extensive steam recycles. However the processes described in the literature prior to U.S. Pat. No. 7,641,888 (Gobina et al.) utilise a pre-mixed feed well within the explosive limits of the gases to produce a selective reaction. U.S. Pat. No. 7,641,888 is incorporated herein by reference. This presents significant safety problems particularly in operation and preheating of the respective feeds. The safety of the reaction relies on the gas velocities being maintained at a sufficiently high speed and that flash back to the inlet point does not occur.

With the invention of a two chamber reactor separated by a porous, catalytic membrane with mixing and reaction taking place simultaneously within the reactor the safety of the system was greatly improved.

However, there is another problem that is found within a fixed bed partial oxidation reactor that is described in the literature but not referred to in the Gobina patent. That is the problem of catalyst overheating. It has since been found that a similar problem can also occur within the two chamber porous membrane reactor described. The steps to overcome this problem within a simple adiabatic reactor are the subject of this patent.

The partial oxidation of methane is a very rapid reaction that takes place at temperatures in excess of 600 deg C. Typically, when performed using a fixed bed of catalyst with a premixed feed comprising methane and oxygen (gas molar ratio of 2:1) the feed or catalyst is preheated to at least 400 deg C. to achieve light off (Journal of catalysis, 249 (2007) pp 380-393 Horn et al.) such that light off of the catalyst is achieved and good selectivity to carbon monoxide is achieved. Once the catalyst is operating at temperature radiation and thermal conduction through the bed, preheating the incoming gas is sufficient to maintain the reaction without preheat. The temperature of the gases passing over the catalyst rapidly rises and under adiabatic conditions (no heat loss) the product gases leaving the reactor can be in excess of 900 deg C. It is also beneficial if the reaction can be performed at elevated pressure since most of the processes that utilise syngas to form another chemical do so at raised pressure and the costs of compressing the component feed streams (comprising methane and oxygen) is less than compressing the resultant syngas. This is principally as a result of the increase in gas volumes that accompany the reaction. The partial oxidation of methane as described in U.S. Pat. No. 7,641,888 (Gobina) is found to have similar characteristics in that it is most beneficially carried out at elevated temperature and pressure.

At temperatures above 600 deg C. the strengths of common materials of construction (e.g. SS 316) for process vessels diminish significantly. In addition material compatibility to avoid corrosion presents problems. Consequently pressure vessels operating at high temperature often require lining with more exotic materials to prevent corrosion and may also require a high strength alloy.

The alternative to construction with an exotic alloy (e.g. 800HT) is to refractory line the inside of the vessel to reduce heat transfer to the pressure containing shelf such that external heat losses results in the shell being maintained at a significantly lower temperature than the gases within the reactor. The demands on the material of construction of the unit are therefore reduced and a cheaper lower specification material can be utilised.

Furthermore, if the reaction can be operated successfully in adiabatic mode then minimal internal pressure containing elements are required within the reactor and use of high alloy materials can be avoided.

In summary the cheapest form of reactor for a high temperature reactor is a refractory lined pressure vessel with no heat transfer to a utility fluid (an adiabatic reactor). This is well known to an engineer who is skilled in the art of reactor design.

There are two main problems that are found in the operation of a fixed bed catalyst with pre-mixed feed for the partial oxidation of methane. The first is the safety issues that are associated with operating in an explosive regime. Some have sought to counteract this by stage wise addition of oxygen to the feed methane requiring a complex series of fixed beds and gas distributors (Conoco U.S. Pat. No. 7,261,751).

The second problem, found with rhodium partial oxidation catalysts in a fixed bed arrangement, is that despite the high selectivity that is achievable with this form of catalyst very high catalyst surface temperatures can form that far exceed the adiabatic reaction temperature. Some have attributed this rise in surface temperature to the super-adiabatic effect that is related to the higher diffusion rates of $H_2$ and H in combustion processes, others have suggested it is a consequence of competing kinetics.

It is an object of at least one aspect of the present invention to obviate or mitigate at least one or more of the aforementioned problems.

It is a further object of at least one aspect of the present invention to provide a process and apparatus for the adiabatic conversion of methane.

It is a further object of at least one aspect of the present invention to provide an apparatus to enhance the recovery of energy produced in the exothermic reaction.

It is a further object of at least one aspect of the present invention to provide an apparatus to enhance the flexibility of handling different pressures and feedstock while keeping high yields.

SUMMARY OF THE INVENTION

According to a first aspect of the present invention there is provided a reactor for the partial oxidation of methane where a first and second reactant gas react in a channel surrounded by a porous catalytic reaction zone where the length and diameter of the channel is chosen such that the Reynolds number in the channel is greater than 500.

According to a second aspect of the present invention there is provided a reactor for the partial oxidation of methane, said reactor comprising:

a first chamber forming a passageway for a first reactant gas (e.g. in the form of methane);

a second chamber forming a passageway for a second reactant gas (e.g. in the form of oxygen);

a porous catalytic membrane separating the first and second chambers, said membrane being capable of allowing the second reactant gas (e.g. oxygen) to permeate from the second chamber through to the first chamber to react with the first reactant gas (e.g. methane) in a reaction zone of the apparatus;

wherein the first chamber has a length and diameter such that the Reynolds number of the first reactant gas passing along the length of the first chamber has a Reynolds number greater than about 500.

Typically, the first reactant gas may be methane and the second reactant gas may be oxygen.

The Reynolds number in the first chamber may be selected from any of the following: greater than about 1,000; greater than about 5,000; or greater than about 10,000.

Alternatively, the Reynolds number in the first chamber may be from about 500 to 20,000 or about 1,000 to 20,000.

To obtain the required Reynolds number the length of the first chamber may be selected from any of the following: longer than about 400 mm; longer than about 600 mm; longer than about 1,200 mm; longer than about 2,000 mm; or longer than about 5,000 mm.

To obtain the required Reynolds number the hydraulic mean diameter of the first chamber may be selected from any of the following: greater than about 2 mm; greater than about 5 mm; greater than about 10 mm; or greater than about 20 mm.

To obtain the required Reynolds number the hydraulic mean diameter of the first chamber may be selected from any of the following: less than about 300 mm; less than about 100 mm; or less than about 50 mm.

Typically, the oxygen may be fed to the reactor through a porous zone that is separate from the porous catalyst containing zone where:

a. The Reynolds number in the chamber comprising oxygen is maintained lower than in the channel comprising methane b. Where the oxygen porous distributor is open ended.

In particular embodiments, a fraction of the gas is allowed to pass from one chamber to another without passage through the catalytic membrane.

The reactor may be refractory lined. Therefore, a shell of the reactor may have an internal refractory material capable of self containing heat giving the reactor adiabatic features that will allow the recovery of heat after passing through the reactor. The energy from the hot gases can then be used to generate energy or pre heat gases at the beginning.

Typically, the reaction may use air or any combination of oxygen enriched air.

The adiabatic reactor may also allow for cleaning in situ by means of Introduction of, for example, steam to improve gas inlet velocity, decrease carbon formation and improve hydrogen yields.

The adiabatic reactor may also allow introduction of nitrogen to enhance reactor performance and reduce the reaction temperature.

The adiabatic reactor may also allow gas product extraction on both sides of the membrane, in other words the adiabatic reactor enables recovery of the syngas produced through the middle of the reactor on the membrane side or through the shell of the adiabatic reactor.

The adiabatic reactor may also allow for in situ regeneration of catalyst.

The adiabatic reactor may be used for producing syngas in ratios of about 1.8:1 $H_2/CO$ all the way to about 6:1 if desired.

The adiabatic reactor may therefore be used for handling; Natural gas, Coal Bed Methane and Biogas.

According to a third aspect of the present invention there is provided a method for partially oxidizing methane, said method comprising:

providing a first chamber forming a passageway for a first reactant gas (e.g. in the form of methane);

providing a second chamber forming a passageway for a second reactant gas (e.g. in the form of oxygen);

providing a porous catalytic membrane separating the first and second chambers, said membrane being capable of allowing the second reactant gas (e.g. oxygen) to permeate from the second chamber through to the first chamber to react with the first reactant gas (e.g. methane) in a reaction zone of the apparatus;

wherein the first chamber has a length and diameter such that the Reynolds number of the first reactant gas passing along the length of the first chamber has a Reynolds number greater than about 500.

The reactor may be as defined in the first, second, or third aspects.

BRIEF DESCRIPTION OF THE DRAWINGS

Embodiments of the present invention will now be described, by way of example only, with reference to the accompanying drawings in which.

BRIEF DESCRIPTION

The present invention therefore relates to a reactor for the partial oxidation of methane using a porous walled channel capable of creating turbulence for methane gas prior to reacting with oxygen gas. The turbulence is created by forming the porous walled channel to have a Reynolds number of greater than 500.

In fluid mechanics, the Reynolds number Re is a dimensionless number that gives a measure of the ratio of inertial forces $\rho V^2/L$ to viscous forces $\mu V/L^2$ and consequently quantifies the relative importance of these two types of forces for given flow conditions. The concept was introduced by George Gabriel Stokes in 1851, but the Reynolds number is named after Osborne Reynolds, who popularized its use in 1883.

The reaction being sought in the present invention where the first reactant gas is methane and the second reactant gas is oxygen is the following partial oxidation reaction to form synthetic gas:

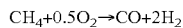

$$CH_4 + 0.5O_2 \rightarrow CO + 2H_2$$

As an example if we take a porous cylindrical tube with layer thickness of 2 mm, with a rhodium metal concentration of 0.09 wt %, then with a fixed GHSV we can vary the length and diameter such that the pressure drop remains constant (1 bar) down the length of the tube. The pressure drop is calculated from the theoretical frictional pressure losses. As the diameter of the tube is increased, the length of the tube can be increased to maintain the same pressure drop. As the amount of tube is increased so the amount of catalyst is increased so the flow through the tube can be increased.

Figure 1:
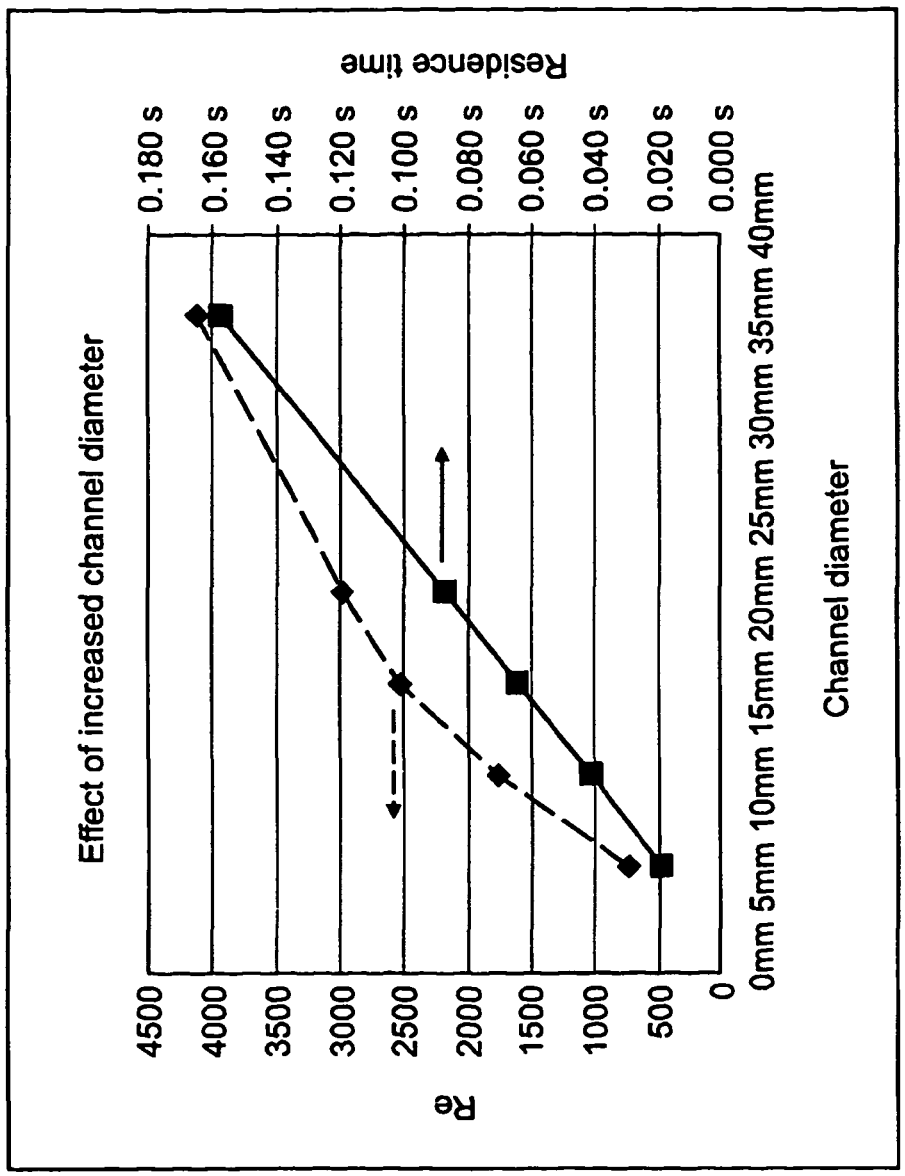
FIG. 1 shows this correlation between hydraulic mean diameter and Reynolds number for a series of catalyst channels with a fixed surface catalyst concentration and fixed pressure drop according to an embodiment of the present invention.

FIG. 1 shows the correlation between hydraulic mean diameter and Reynolds number for a series of catalyst channels with a fixed surface catalyst concentration and fixed pressure drop. FIG. 1 also illustrates the relationship between diameter and residence time.

The most beneficial diameter of catalyst channel is when turbulence is just achieved. Further increasing the diameter reduces the catalyst volume density unnecessarily increasing the reactor size.

Increasing the GHSV of the catalyst (for example by increasing the catalyst dispersion) increases the flow that can be passed down the tube, requiring a larger diameter to avoid excessive pressure drop.

The effect of the turbulence is most pronounced at the inlet of the reactor and so this is where most effort is put into ensuring turbulence is produced. While Reynolds number of about 4,000 or more are sufficient to ensure that turbulence will occur throughout the tube, at lower Reynolds numbers then high local velocities and high energy dissipation into the stream can ensure the presence of turbulence. For example, a combination of obstructions and narrowing on the inlet of the stream comprising methane can ensure that turbulence is stimulated.

The effect of the turbulence can be seen in the following CFD model of a porous catalyst channel. The example shows a theoretical catalyst channel with a 37 mm hydraulic mean diameter operating at low flow laminar regime and high flow turbulent regime.

Typically, in either laminar or turbulent regime increasing the flow rate through the reactor increases the surface temperatures seen. However if the reactor design is altered so that the principal channels operate in the turbulent regime in order that the high temperatures seen at the inlet end of the catalyst bed are greatly reduced, therefore increasing the stability of the catalyst.

EXAMPLE

One method of evaluating the performance of different reactor geometries is to model the reaction using accepted published kinetics. For example, the kinetics from Deutschmann and L. D. Schmidt (Two-dimensional modeling of partial oxidation of methane on Rhodium in a short contact time reactor, Olaf Deutschmann and Lanny D. Schmidt, Twenty-Seventh Symposium (International) on Combustion/ The Combustion institute, 1998/pp. 2283-2291) undertaken in different reactor geometries has been cited worldwide by other authors can be used within a CFD model to determine the surface temperatures that would be present in different catalyst geometries. Applying these kinetics to a 1 m long porous tube 41 mm in diameter contained within an adiabatic reactor whereby the oxygen is introduced through a porous wall running the length of the reactor the catalyst temperature can be estimated. Using a flow of either 10 L/min or 100 L/min of methane at 4 bara down the centre of the porous tube the temperature profile can be determined in either a laminar or turbulent regime. In this reactor system the oxygen is fed into the shell of the reactor space outside of the porous cylinder and the methane is fed down the centre of the cylindrical tube. The methane and oxygen mix and contact the catalyst in the porous region, reacting to produce a synthesis gas containing hydrogen and carbon monoxide and carbon dioxide.

Figure 2:
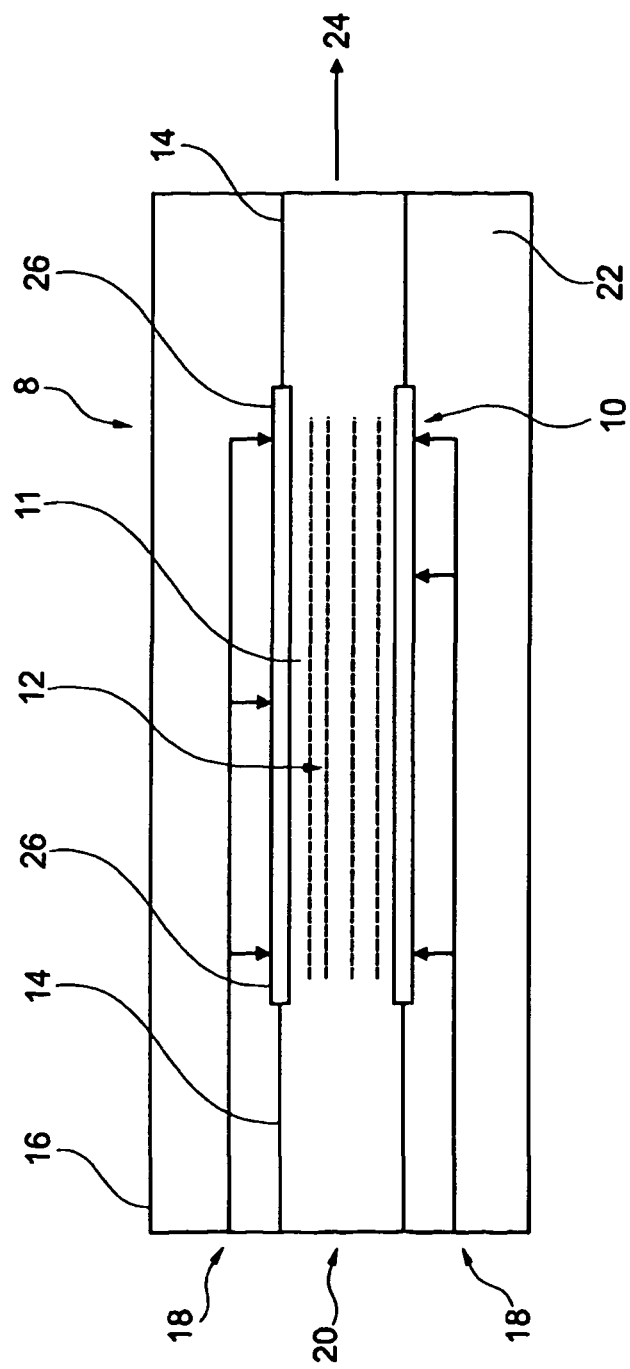
FIG. 2 is a schematic diagram of a porous membrane reactor according to an embodiment of the present invention.

FIG. 2 is a schematic representation of an apparatus 8. An oxygen ($O_2$) supply 18 is fed into the outer bore 22 at one end of the membrane apparatus 8, and a natural gas (which mainly comprises methane ($CH_4$)) supply 20 is fed into the corresponding end of the inner bore 14. The partial pressure of the oxygen 18 is maintained at a higher pressure than that of the methane supply 20, which results in the oxygen passing through the pores (not shown) of the modified membrane 10 from the outer bore 22 to the inner bore 14. Upon doing so, the oxygen molecules come into contact with the catalysts 12 present in the sidewall 13 of the modified membrane 10, which activates the oxygen molecules before contacting the methane present in the inner bore of the modified membrane 10. The catalyst lowers the activation energy of the reaction so that the reaction takes place at lower temperatures than the uncatalysed reaction and so as methane and oxygen contact in the presence of the catalyst syngas is instantly formed according to the following chemical reaction:

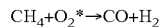

$$CH_4 + O_2^* \rightarrow CO + H_2$$

The produced syngas exits the membrane apparatus 8 from the other end of the inner bore 14 due to the natural pressure differential created by the methane supply 20, such that a syngas flow 24 is created. Pressure control of the oxygen supply 18 flow rate allows different flow rates of the methane supply 20 to be used, since an increase in the pressure of the oxygen supply will result in a greater flux of oxygen through the pores of the modified membrane 10. In use a gas stream comprising the methane flows next to or through the catalyst impregnated layer 12. The thermally stabilized gamma alumina layer 30 on the bore side 14 increases the specific surface area of the support and stabilizing a high surface area of metal catalyst which enhances the reaction between permeated oxygen and the methane. Since the oxygen molecules have to diffuse to the bore side 14 of the gamma alumina layer 30 and the adjacent porous layer, the gaseous environment of the gamma alumina layer 30 at and near the bore is less reducing than in the outer porous layers. As a result a complete or partial oxidation reaction will take place here with some reforming occurring as gas moves away from the gamma alumina layer 30 respectively. It is advantageous to coat pores of the last porous support layer with the reforming catalyst such as Rh to induce some endothermic reforming as combustion products flow through the porous support layer. This will assist in removing the heat of the exothermic oxidation reaction from the surface of the active porous layer.

In FIG. 2, the oxygen at point 18 may be fed at a rate of 5-500 L/min and the methane at point 20 may be fed at a rate of 10-1000 L/min.

The length and diameter of the inner bore 14 is selected to provide a Reynolds number of greater than 500 such that turbulence within the inner bore will occur. The unitless Reynolds number, as defined by the ratio (rho×v×D/mu) (density×velocity×hydraulic mean diameter/viscosity) is an indication of whether turbulent or laminar flow is present in developed fluid flow. A Reynolds number below 2000 for a smooth bore pipe, or below 1000 for a rough pipe is indicative that the fluid flow within the pipe will be in a laminar regime. At values higher than this then turbulence is possible. For flow in non-cylindrical geometries the Reynolds number can be determined using the hydraulic mean diameter, calculated from a ratio of the wetted perimeter and cross sectional area. Turbulence increases mass transfer by allowing local circulation of fluids and non-diffusion based transport of material. Similarly turbulence aids heat transfer by allowing convective as well as conduction mechanisms for heat transfer.

For a heat exchanger where heat is removed from a hot surface the effect of turbulence is to thin the boundary layer of fluid that is at the surface temperature and enhance the heat transfer process away from the boundary layer. This can result in a cooling of the surface when compared with a laminar flow heat exchanger. However, although turbulence enhances the heat transfer coefficient, increasing the dimensions of the heat exchanger (thereby increasing the hydraulic mean diameter and Reynolds number) increases turbulence but also reduces the surface area provided by the exchanger. Where a compact high heat transfer heat exchanger is required the best solution is to utilize a small channel heat exchanger, which suffers the penalty of reduced heat transfer coefficients due to the laminar flow characteristics, but is able to provide a much higher surface area to volume ratio for high overall rates of heat transfer.

Where it is desired to control the temperature of a catalytic reaction within close bounds, the temperature of the fluid (and catalyst) is controlled by transfer of the reaction heat away from the catalytic surface to a heat transfer surface and then into a secondary fluid. Turbulence again reduces the thickness of the boundary layer and enhances heat and mass transfer from the catalyst. However, the surface temperature of the catalyst is not usually affected by the increased turbulence. Unlike with bulk well-mixed reactions where the reaction can continue in the absence of mass transfer, with surface catalysed reactions the increase in heat transfer with turbulence also accompanies an increased mass transfer which can increase the reaction rate and the resultant rate of heating. The result of this is that the fluid in contact with the catalyst will remain at the temperature of the catalyst. This temperature will be no more than the adiabatic reaction temperature that can be calculated from a knowledge of the thermodynamic properties of the fluids and reactants.

For the catalytic partial oxidation reaction conventional wisdom is that the reaction is not mass transfer limited and so in order to produce a compact and efficient reactor the catalyst support is designed with a small channel size that enables a high volumetric concentration of catalyst to be used. The channel size is only limited by the increasing pressure drop that results as the channel size is decreased. Increasing the channel size to more than the minimum required to avoid excessive pressure drop will result in a less effective reactor.

Figure 5A:
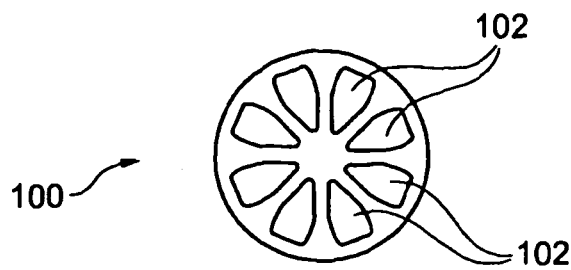
FIGS. 5a to 5d represent membranes for generating turbulence according to embodiments of the present invention.

Moving away from conventional wisdom we have found that operating with a larger channel and significantly larger Reynolds for the gas containing methane does reduce the volumetric loading of the catalyst but has the beneficial effect of greatly reducing the high surface temperatures that are generated at the catalyst surface with laminar flow. Even though no heat transfer out of the reactor occurs and therefore no heat transfer surface is provided. This is surprising as the surface temperature of an adiabatic reaction normally depend solely on the reaction coordinate—the degree to which the reaction has moved to completion. Enhancing mass transfer in the oxygen containing stream alone results in increased surface temperatures which is not beneficial In U.S. Pat. No. 7,641,188 the methane stream passes down a membrane that is approximately 10 mm in diameter with internal channels separated by three spokes giving a hydraulic mean diameter of channel of 4 mm. This membrane is manufactured from a commercially available ceramic support that is designed to maximize the internal channel surface area without excessive pressure drop from fluid flow. Larger diameter supports are available and the cross section of one such support is shown in FIG. 5a. Again the hydraulic mean diameter of the channels is about 4 mm. While the high surface area is also helpful for stabilizing the structure during extrusion and also generating large surface area of metal catalyst it is detrimental to the promotion of turbulence—design 5a is not suitable to use with methane passing down the centre channels. Increasing the dimension of the channels and the diameter of the support reduces the surface area of support available to support catalyst, makes the structure less stable during extrusion manufacturing but beneficially increases the hydraulic diameter of the channel. Similarly increasing the size of the chamber external to the membrane increases the size of the reactor and reduces the volumetric concentration of the catalyst. However as has been shown if turbulence occurs the catalyst overheating problem can be prevented. Hence increasing the hydraulic mean diameters of the chambers such that turbulence can occur is beneficial. For methane passing down the centre channels the membrane design must be modified from FIG. 5a to FIG. 5c for turbulence to be achieved. Reducing the number of spokes in the design of larger membranes is beneficial, although again this makes manufacture of the support by extrusion more difficult. Further, installing injectors, swirl devices or obstructions in the methane flow to ensure turbulence is present even at Reynolds numbers below 4000 is beneficial. Additionally preventing turbulence occurring in the oxygen chamber through the use of an oxygen distributor to eliminate local high velocities that can increase the mass transfer of oxygen above that of the methane is beneficial.

Figure 3:
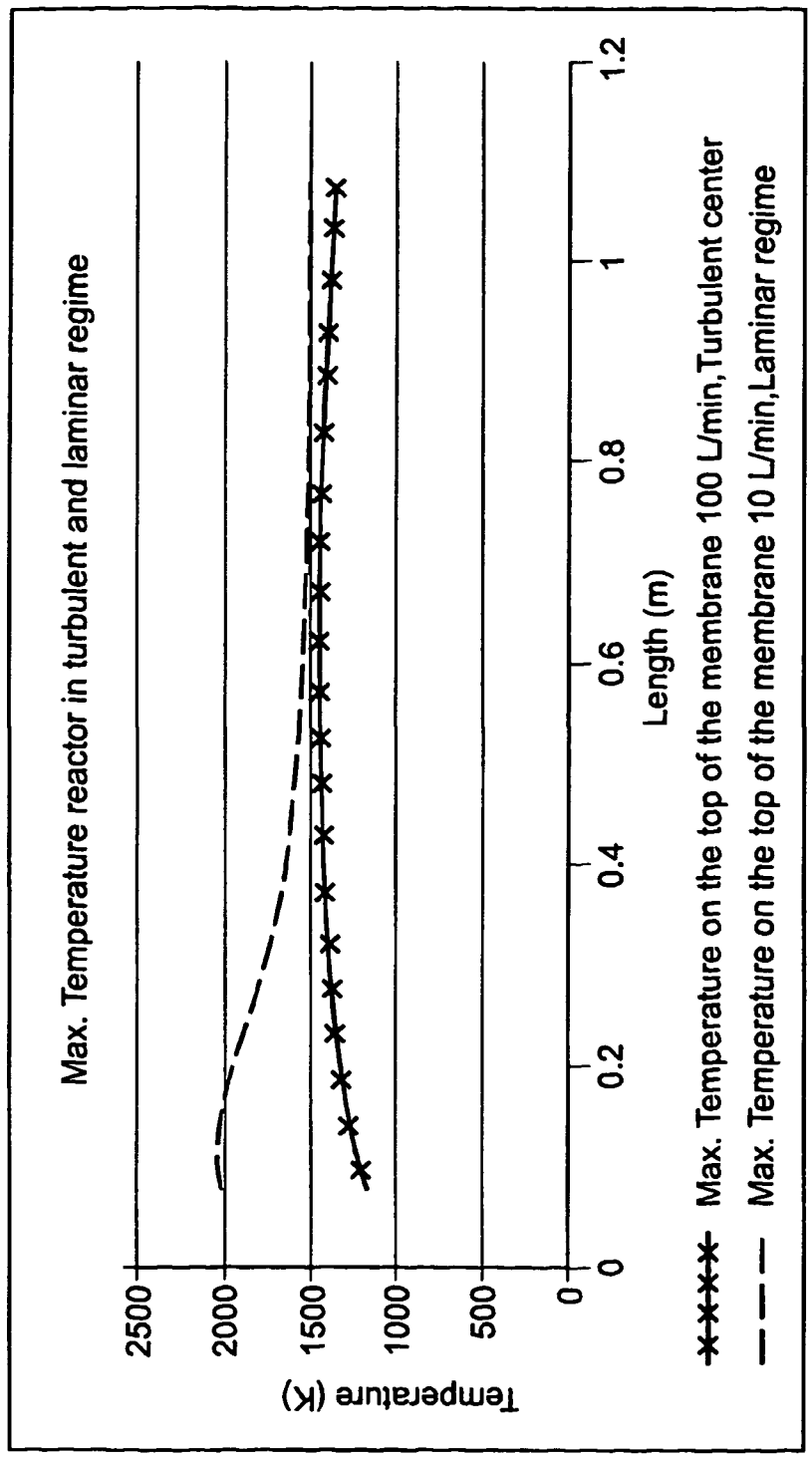
FIG. 3 is a representation of turbulence on reducing catalyst temperature in a cylindrical catalytic porous tube reactor according to an embodiment of the present invention.

FIG. 3 shows the effect of turbulence on reducing catalyst temperature in a cylindrical catalytic porous tube reactor.

Figure 4:
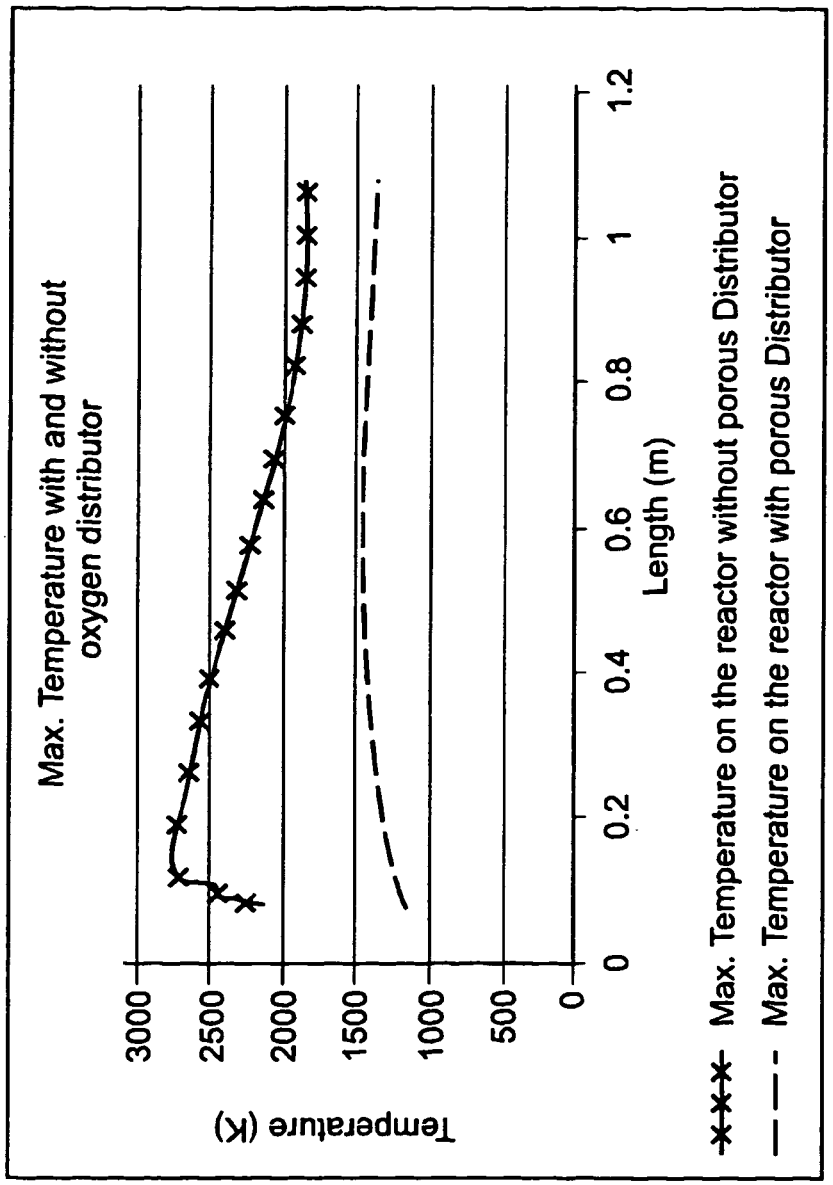
FIG. 4 is a representation of the effect of increasing the mass transfer of oxygen by removal of a porous distributor according to an embodiment of the present invention.

The effect of hindering the mass transfer of the oxygen flow and preventing localized high velocities in the oxygen stream can also be seen in the temperature profile in FIG. 4. FIG. 4 shows the effect of removing the porous distributor on the catalyst temperature in the example described above at the high flow rate of 100 L/min. In particular, FIG. 4 shows the effect of increasing the mass transfer of oxygen by removal of the porous distributor.

If it is the oxidant that is passed down the centre channel or channels of the catalytic membrane then it is advantageous that turbulence is achieved on the outside of the catalytic membrane without excessive residence time. This is most simply achieved by providing sufficient length of catalyst membrane such that the desired GHSV (gas hourly space velocity) results in turbulent flow. Typically this will require the chamber containing the methane to be at least 1 m in length surrounding a catalytic membrane of at least 25 mm in diameter and for the outer chamber to have a hydraulic mean diameter of at least 25 mm. It may be beneficial for the purposes of control and gas distribution for each membrane to be surrounded by a metal shroud that can control the direction of flow and aid turbulence. In addition at the methane inlet may be provided a means of enhancing the turbulence and gas distribution such as a swirl device or other turbulence inducing device.

While turbulence in the oxygen chamber may be beneficial where very high mass transfer in the methane chamber has already been achieved it is less necessary and generally a lower Reynolds number in the oxygen chamber should be maintained. When the oxidant passes down the central chamber a small channel membrane may appear desirable for the catalytic membrane to prevent turbulence however it can result in material stability issues for the ceramic due to the concentration gradients it produces. It also prevents the use of a separate oxygen distributor.

Figure 5B:
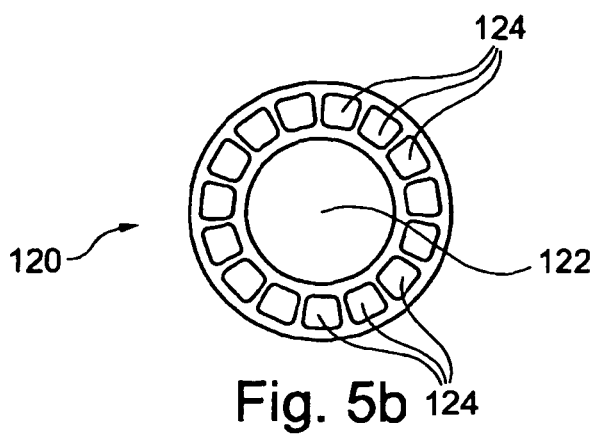
Figure 5C:
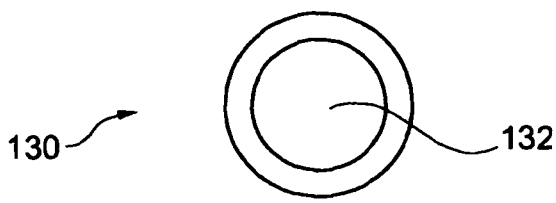
Figure 5D:
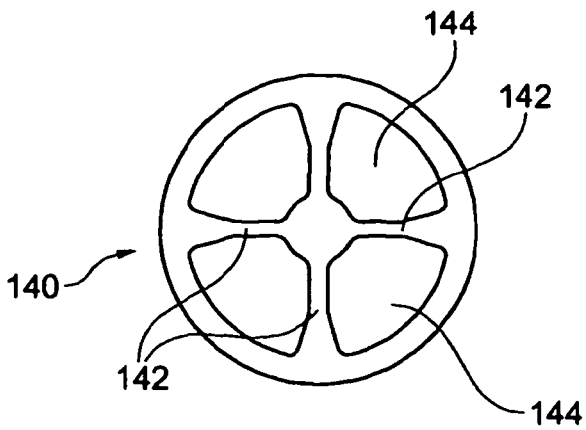
Figure 6:
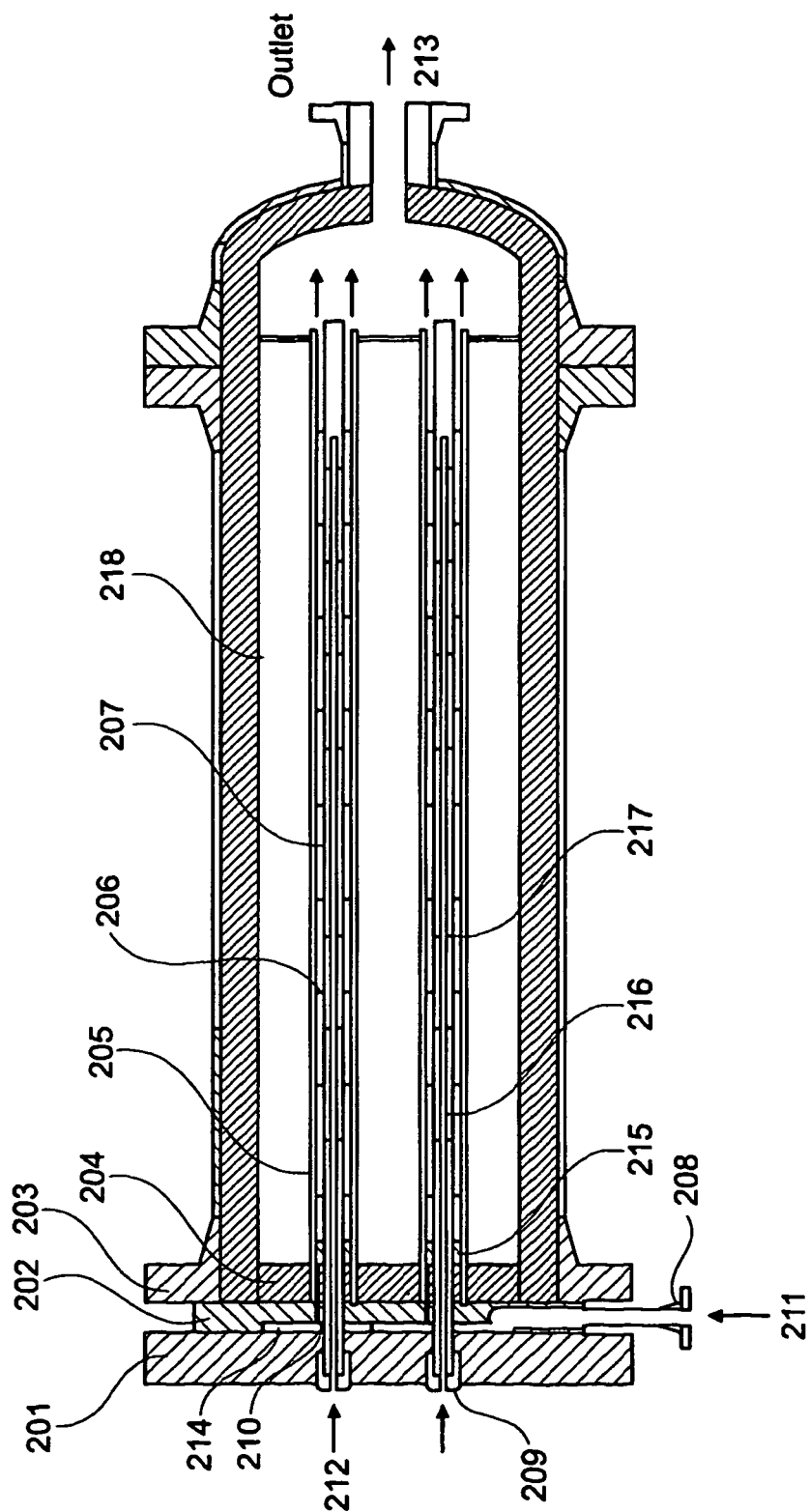
FIG. 6 is a representation of a porous membrane reactor comprising a large central channel to allow insertion of a distributor and an external chamber designed to allow turbulence to develop according to an embodiment of the present invention without excessive residence time.

FIGS. 5a-d represent catalytic membranes for generating turbulence in a porous membrane reactor as previously described. FIG. 5a represents a membrane 100 made from ceramic with a diameter of about 25 mm. The membrane 100 has a series of outer located channels 102. This membrane configuration is only suitable for use with a reactor configuration as shown in FIG. 6 in which the oxygen containing stream passes down the channels 102 and the methane containing stream passes along the external surface of the membrane 100 unlike U.S. Pat. No. 7,641,888. The channels 102 are too small for turbulence to develop internally without causing a large pressure drop. FIG. 5b represents a membrane 120 which has a central channel 122 and a series of outer located channels 124. The central channel has a large enough diameter to be used in either reactor configuration FIG. 6 or FIG. 7 as in the configuration shown in FIG. 6 and internal oxygen distributor can be fitted or in configuration shown in FIG. 7 in which the methane flow passes through the central channel 122 turbulent methane flow can develop. FIG. 5c represents a membrane 130 with a simple large channel 132 which is similar in design and use as the configuration FIG. 5b. In the configuration shown in FIG. 5c thicker wall is utilised to enable a stable extrusion, whereas in FIG. 5b the extrusion is made more stable through the use of a lighter but more complex and larger volume structure. FIG. 5d is a further membrane 140 where the number of spokes 142 has been minimised to achieve a balance between the hydraulic mean diameter of channels 144 and stability of the ceramic in the extrusion process. The structure would typically have an external diameter in excess of 50 mm and with individual channels 144 having hydraulic mean diameters in excess of 25 mm. This structure is most suitable for use in reactor configuration FIG. 7 in which the methane passes down the centre channels.

FIG. 6 is a further reactor of the present invention which specific component parts described below.

Reactant gas 211 contains methane and is fed into nozzle 208 entering the distribution chamber 214 that is bounded by the end plate 201 and the intermediate plate 202. As the reactant gas is at a temperature below 600 deg C. and the chamber 214 is protected from the high temperature chamber 218 by the refractory material 204 the principle metal of construction for the end plate and other items around chamber 214 can be 310 stainless materials. The methane containing gas then passes through the plate 202 and refractory material 204 through an orifice 210, through a turbulence inducing device 215 such as a swirl generator into a chamber bounded by the sheath 205 and catalytic membrane 207.

The oxygen containing reactant gas 212 is fed via a manifold into each individual catalytic membrane through a cap 209. The sealing cap 209 allows insertion of the membrane into the reactor and also forms a pressure seal against the plate 201. Reactant gas 212 is prevented from mixing with reactant gas 211 by a metal sealing cylinder that surrounds the end of the catalytic porous membrane.

A porous distributor for the oxygen 216, either made of metal or ceramic, is located down the centre of the catalytic membrane and sealed using a mineral seal such as a mica or exfoliated mica type of block seal around the end of the catalytic membrane. The porous gas distributor and catalytic membrane are supported by structures 206 and 217.

The gap between the sheath 205 and the membrane 207 is typically about 25 mm allowing turbulent flow to develop. The sheath 205 and swirl device 215 work in conjunction to generate high local gas velocities particularly at the inlet of the methane where otherwise gas velocities and turbulence would be at a minimum. As the reaction proceeds there is an increase in the gas volume leading to higher velocities and higher levels of turbulence. At the chamber entrance where the velocities are lowest is also the location where turbulence is beneficial. Consequently, particularly where the Reynolds number of the flowing gas would be below 4000 it is beneficial at the chamber entrance to locally enhance methane gas velocities. A swirl device 215 achieves this by imparting a rotational as well as linear velocity to the gas. Further a flow guide or sheath 205 within the reactor can aid the onset of turbulence and with the addition of vanes could further increase gas velocities. while reducing dead volume and therefore reducing residence time within the reactor. At higher catalyst loadings, higher flow rates and with the largest diameter membranes, where the pitch of the tubes is no longer determined by the space requirement of the seal and sealing caps the sheaths may not be required.

The oxygen containing gas and methane containing gas contact in the porous catalytic membrane with bulk flow of gas from the centre of the porous catalytic membrane to the reaction chamber 218. The syngas 213 produced by reaction of the oxygen and methane remains outside of the porous catalytic membrane and exits the shell of the reactor.

Typically, a geometry of membrane as shown in FIG. 5b would be used with a membrane external diameter of approximately 50 mm. The porous catalytic membrane would be 207 approximately 3000 mm long, manufactured from a thermally resistant alumina based ceramic containing 0.1 wt % rhodium as catalyst deposited onto a thermally stabilized alumina coating.

The main body of the reactor 201 can be manufactured from 310 stainless material as the refractory lining 204 protects the shell from excessive heat allowing use of a lower thickness material.

Figure 7:
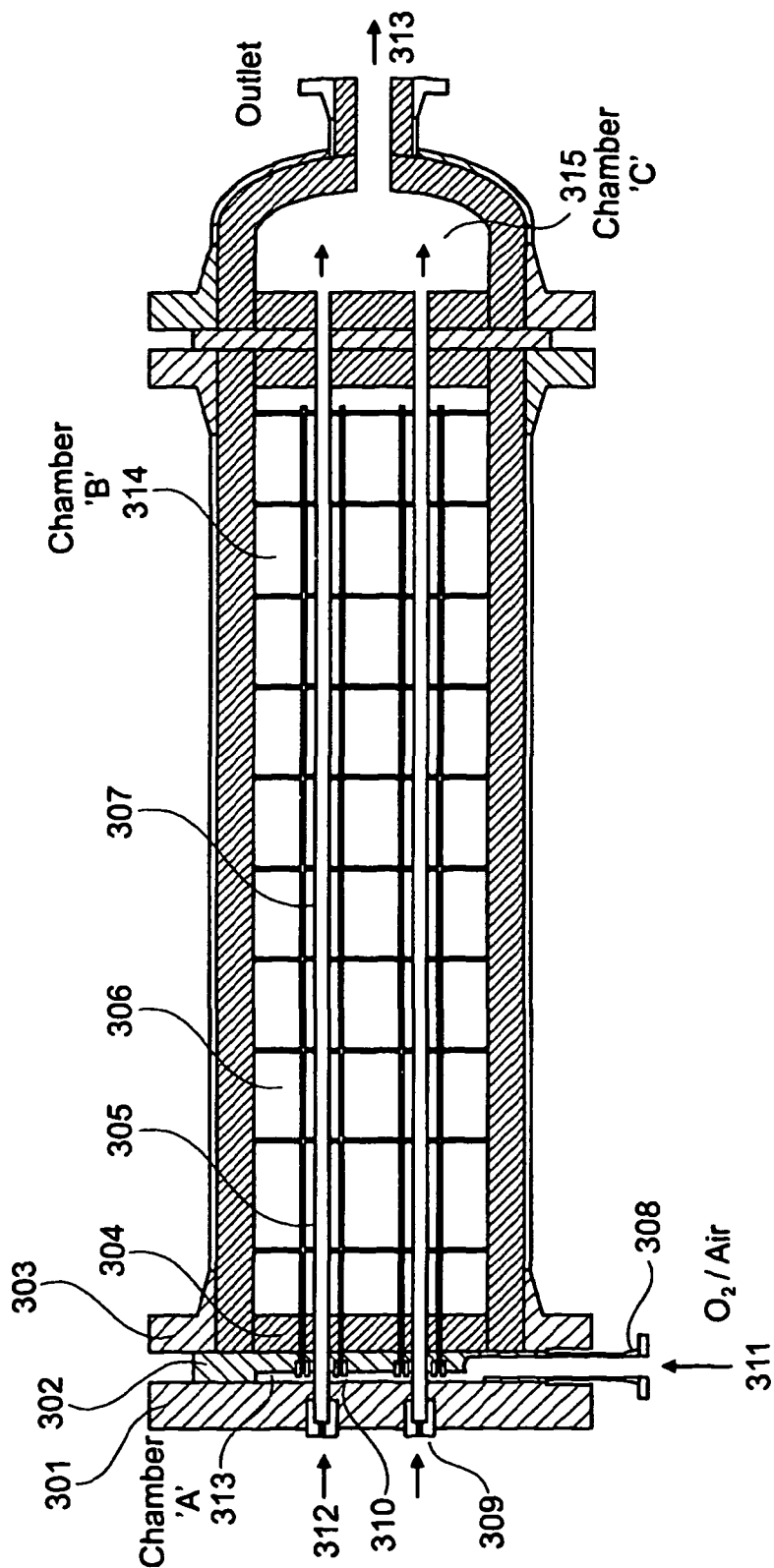
FIG. 7 is a representation of a further porous membrane reactor comprising a porous oxygen distributor and large central chamber to allow turbulence to develop according to an embodiment of the present invention.

FIG. 7 is a further reactor of the present invention which specific component parts described below.

Oxygen containing gas 311 is fed into nozzle 308 and enters chamber 313 bounded by reactor end plates 301 and intermediate plate 302. Again the chamber 313 is maintained at a temperature below 600 deg C. by the use of refractory lining 304. The oxygen containing gas 311 is distributed into the main chamber 314 by passage along and through porous metallic or ceramic distributors 305. The distribution passage prevents stimulation of turbulence within the oxygen chamber as well as hindering the mass transfer of the oxygen to ensure good stoichiometry at the catalyst. The methane containing gas 312 passes through the reactor sealing caps 312 into the centre of the porous catalytic membrane 307. The sealing caps 310 allows insertion of the membrane. At the inlet to the porous catalytic membrane there may optionally be a device that enhances the turbulence within the central channel of the membrane which may be a simple narrow tube to increase the local velocity, or a more complex injector with other fluids added e.g. water or device for turbulence induction (not shown). Particularly where the Reynolds number of the flowing gas would be below 4000 it is beneficial at the chamber entrance to locally enhance methane gas velocities. A swirl device 215 achieves this by imparting a rotational as well as linear velocity to the gas.

The methane and oxygen are prevented from contacting within chamber 313 by a metal sleeve surrounding each catalytic membrane in this chamber.

Within the main chamber 314 the gases contact within the catalytic porous membrane 307.

The oxygen distribution tubes 305 and porous catalytic membrane 307 are supported by structure 306.

The syngas 313 produced travels down the centre of the membrane and exits into chamber 315. Sealing is arranged around the membranes such that expansion and contraction of the membranes relative to the shell can occur without excessive mechanical stresses. A sliding type of seal is suitable as a high degree of leak tightness is not required. The seal allows a pressure differential to be maintained between the chamber 314 and chamber 315 driving the oxidant flow through the catalytic membrane. A small amount of leakage is allowable as this does not affect the performance of the reactor and may be beneficial in moderating the pressure drop across the membrane at high flows.

A suitable membrane configuration for this reactor type would be FIG. 5b or 5c with an internal diameter within the membrane of about 25 mm and a length of membrane of approximately 3000 mm.

Whilst specific embodiments of the present invention have been described above, it will be appreciated that departures from the described embodiments may still fall within the scope of the present invention. For example, any suitable type of membrane reactor may be used.

The invention claimed is:

1. A method of producing a gas, comprising the steps of:
providing a reactor having a first chamber having an inlet in which said first chamber comprises a porous wall channel having a length of 600 mm or greater and which is separated from a second chamber by a porous catalytic reaction zone;
feeding a first feed stream through said inlet to said first chamber such that a Reynolds number of said first feed stream at the inlet of said reactor is about 4000 or greater so that turbulence is generated in said first feed stream;
wherein said first feed stream comprising a methane;
feeding a second feed stream to said second chamber, said second feed stream comprising an oxygen;
permeating said oxygen from said second chamber through said porous catalytic reaction zone into said first chamber;
reacting via partial oxidation said methane and said oxygen when the flow regime of said first feed stream in said channel during said reacting is turbulent;
wherein the porous wall channel creates turbulence in said first feed stream,
reacting at least a portion of said first feed stream and at least a portion of said second feed stream when a Reynolds number of said first feed stream is about 10,000 or greater;
said reacting being adiabatic;
catalyzing said reacting by a catalyst comprising rhodium in the porous catalytic reaction zone;
said reacting by said catalyst comprising rhodium occurring at a temperature which is below 1500K and occurring along the length of said channel of 600 mm or greater,
producing a gas of said partial oxidation reaction having a composition comprising a carbon monoxide, a hydrogen and a methane; and
producing said gas having a ratio of $H_2$:CO in a range of from about 1.8:1 to 6:1.

2. The method of producing a gas according to claim 1, further comprising the steps of:
providing said first chamber having a channel, and
choosing said length and said diameter of said channel such that the Reynolds number in the channel of said first stream is greater than 10000 during said reacting step.

3. The method of producing a gas according to claim 1, further comprising the steps of:
providing said first chamber having a channel having a hydraulic mean diameter greater than about 25 mm and which has said porous catalytic reaction zone surrounding said channel.

4. The method of producing a gas according to claim 1, further comprising the steps of:
providing said first chamber having a channel having a hydraulic mean diameter greater than about 50 mm and said porous catalytic reaction zone surrounding said channel.

5. The method of producing a gas according to claim 1, further comprising the steps of:
providing said first chamber having a channel having a hydraulic mean diameter greater than about 10 mm and which has said porous catalytic reaction zone surrounding said channel.

6. The method of producing a gas according to claim 1, further comprising the step of:
providing said first chamber having a channel which has said porous catalytic reaction zone surrounding said channel.

7. The method of producing a gas according to claim 1, further comprising the step of:
providing said first chamber having a channel which has said porous catalytic reaction zone surrounding said channel and in which the hydraulic mean diameter of the channel is greater than about 5 mm.

8. The method of producing a gas according to claim 1, further comprising the step of:
providing said first chamber having a channel wherein the length is longer than about 1200 mm and the hydraulic mean diameter of the channel is greater than about 5 mm.

9. The method of producing a gas according to claim 1, further comprising the step of:
providing said first chamber having a channel wherein the length is longer than about 2000 mm and the hydraulic mean diameter of the channel is greater than about 5 mm.

10. The method of producing a gas according to claim 1, further comprising the step of:
    maintaining the Reynolds number of second feed stream which comprises oxygen in the second chamber at a value less than the Reynolds number of first feed stream which comprises methane in the first chamber.

11. The method of producing a gas according to claim 1, further comprising the step of:
    maintaining the pressure of the second feed stream which comprises oxygen in the second chamber at a greater pressure than the first feed stream which comprises methane in the first chamber.

12. The method of producing a gas according to claim 1, further comprising the step of:
    feeding said first gas comprising methane such that the Reynolds number at the inlet of said reactor is 4000 or greater and a residence time is in a range of between 0.04 sec and 0.16 sec.

13. The method of producing a gas according to claim 1, further comprising the step of:
    feeding said first gas comprising methane such that the Reynolds number is 4000 or greater at the inlet of said reactor and a residence time is in a range of between 0.12 sec and 0.16 sec.

14. The method of producing a gas according to claim 1, further comprising the step of:
    providing said first feed stream comprising a natural gas.

15. The method of producing a gas according to claim 1, further comprising the step of:
    providing said first feed stream comprising a coal bed methane.

16. The method of producing a gas according to claim 1, further comprising the step of:
    providing said first feed stream comprising a biogas.

17. The method of producing a gas according to claim 1, further comprising the step of:
    providing said second feed stream comprising an air.

18. The method of producing a gas according to claim 1, further comprising the step of:
    providing said second feed stream comprising an oxygen enriched air.

19. The method of producing a gas according to claim 1, further comprising the step of:
    controlling said methane flow rate such that the maximum temperature is less than 1500K when there is a turbulent center.

* * * * *